United States Patent
Thomas et al.

(10) Patent No.: US 11,597,326 B2
(45) Date of Patent: Mar. 7, 2023

(54) CENTER CONSOLE FOR A VEHICLE

(71) Applicant: Ford Global Technologies, LLC, Dearborn, MI (US)

(72) Inventors: Gregory Paul Thomas, Canton, MI (US); Stephen Neal Jacobsen, Plymouth, MI (US); Michele Marie Mathews, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 258 days.

(21) Appl. No.: 17/091,318

(22) Filed: Nov. 6, 2020

(65) Prior Publication Data
US 2022/0144177 A1    May 12, 2022

(51) Int. Cl.
*B60R 7/04* (2006.01)
*B60N 3/10* (2006.01)

(52) U.S. Cl.
CPC . *B60R 7/04* (2013.01); *B60N 3/10* (2013.01)

(58) Field of Classification Search
CPC .................................. B60R 7/04; B60N 3/10
USPC ....................... 296/24.34, 37.8, 37.14, 37.15
See application file for complete search history.

(56) References Cited

U.S. PATENT DOCUMENTS

| | | | |
|---|---|---|---|
| 6,203,088 B1 | 3/2001 | Fernandez | |
| 7,533,918 B2 | 5/2009 | Spykerman | |
| 8,616,605 B2 | 12/2013 | Hipshier | |
| 9,156,407 B1 * | 10/2015 | Kramer | B60R 7/04 |
| 10,011,240 B1 * | 7/2018 | Ranganathan | B60R 16/03 |
| 10,106,092 B2 | 10/2018 | Huebner | |
| 10,181,746 B2 | 1/2019 | Kramer | |
| 2007/0075558 A1 | 4/2007 | Kim | |
| 2008/0079278 A1 * | 4/2008 | Rajappa | B60R 7/04 296/24.34 |
| 2010/0078954 A1 | 4/2010 | Liu | |
| 2011/0068598 A1 * | 3/2011 | Penner | E05B 79/20 70/85 |

* cited by examiner

*Primary Examiner* — Jason S Morrow
*Assistant Examiner* — E Turner Hicks
(74) *Attorney, Agent, or Firm* — Vichit Chea; Price Heneveld LLP (57) ABSTRACT

A center console for a vehicle includes a base. The base is coupled to the vehicle and includes a receptacle. The center console includes a body that is coupled to the base and that includes a shelf. The body is operable to move relative to the base between a retracted position, wherein the shelf covers the receptacle, and an extended position, wherein the receptacle is exposed.

15 Claims, 7 Drawing Sheets

CENTER CONSOLE FOR A VEHICLE

FIELD OF THE DISCLOSURE

The present disclosure generally relates to a center console for a vehicle. More specifically, the present disclosure generally relates to a center console having a base and a body that is movable relative to the base between retracted and extended positions.

BACKGROUND OF THE DISCLOSURE

Vehicles often include center consoles. A center console having a body that is movable within a vehicle to accommodate both front and rear row passengers and that includes a base having a receptacle that may be exposed via movements of the body may be desired.

SUMMARY OF THE DISCLOSURE

According to a first aspect of the present disclosure, a center console for a vehicle includes a base. The base is fixedly coupled to a floor of the vehicle and includes an open-topped receptacle. A body is coupled to the base and is operable to move vehicle-rearward relative to the base from a retracted position to an extended position. The body includes a storage compartment, a door that is operably coupled to the storage compartment and operable between a closed position and an open position, wherein access to the storage compartment is provided, and a shelf positioned vehicle-forward of the storage compartment. The shelf covers the receptacle in the retracted position of the body. The receptacle is exposed in the extended position of the body.

Embodiments of the first aspect of the present disclosure may include any one or a combination of the following features:
  the shelf includes at least one cup holder;
  the receptacle includes a receptacle floor, and a side wall extending vehicle-upward from the receptacle floor to a receptacle rim that defines an opening to the receptacle, wherein a vehicle-forward-most portion of the receptacle rim is positioned beneath the shelf in the retracted position of the body;
  the body includes a tray coupled to the shelf and operable to move relative to the shelf between a stowed position and a deployed position vehicle-forward of the stowed position, wherein the tray is configured to cover the receptacle if the tray is in the deployed position and the body is in the extended position;
  the receptacle includes a receptacle floor, and a side wall extending vehicle-upward from the receptacle floor to a receptacle rim that defines an opening to the receptacle, wherein a vehicle-forward-most portion of the receptacle rim is positioned beneath the tray if the body is in the extended position and the tray is in the deployed position; and
  the shelf includes an upper surface that faces vehicle-upward, wherein the upper surface is nearer than the door to the floor of the vehicle.

According to a second aspect of the present disclosure, a center console for a vehicle includes a base. The base is coupled to the vehicle and includes a receptacle. A body is operable to move relative to the base between a retracted position and an extended position. The body includes a tray that is operable between a stowed position and a deployed position. The body generally covers the receptacle in the retracted position. The receptacle is exposed if the body is in the extended position and the tray is in the stowed position. The tray generally covers the receptacle if the body is in the extended position and the tray is in the deployed position.

Embodiments of the second aspect of the present disclosure may include any one or a combination of the following features:
  the body includes a shelf having at least one cup holder and being operably coupled to the tray, such that the tray moves relative to the shelf between the stowed and deployed positions;
  the shelf covers the receptacle in the retracted position of the body;
  the receptacle is positioned beneath the at least one cup holder in the retracted position of the body;
  the body includes a storage compartment that is positioned further than the shelf from the receptacle in the extended position of the body;
  the body includes at least one rear cup holder, wherein the storage compartment is positioned between the shelf and the at least one rear cup holder; and
  the receptacle includes a receptacle floor, and a side wall extending vehicle-upward from the receptacle floor to a receptacle rim that defines an opening to the receptacle, wherein a vehicle-forward-most portion of the receptacle rim is positioned beneath the body in the retracted position of the body and is positioned beneath the tray if the body is in the extended position and the tray is in the deployed position.

According to a third aspect of the present disclosure, a center console for a vehicle includes a base. The base is coupled to the vehicle and includes a receptacle. A body is coupled to the base and includes a shelf. The body is operable to move relative to the base between a retracted position, wherein the shelf covers the receptacle, and an extended position, wherein the receptacle is exposed.

Embodiments of the third aspect of the present disclosure may include any one or a combination of the following features:
  the body is configured to translate vehicle-rearward from the retracted position to the extended position and translate vehicle-forward from the extended position to the retracted position;
  the receptacle includes a receptacle floor, and a side wall extending vehicle-upward from the receptacle floor to a receptacle rim that defines an opening to the receptacle, wherein a vehicle-forward-most portion of the receptacle rim is positioned beneath the shelf in the retracted position of the body;
  the body includes a storage compartment positioned vehicle-rearward of the shelf;
  the shelf includes at least one cup holder, wherein the receptacle is positioned beneath the at least one cup holder in the retracted position of the base;
  the base is fixedly coupled to a floor of the vehicle; and
  the body includes a tray coupled to the shelf and operable to move relative to the shelf between a stowed position and a deployed position, wherein the tray is configured to cover the receptacle if the body is in the extended position and the tray is in the deployed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1A-3B, a vehicle 10 includes a center console 12. The center console 12 includes a base 14 that is fixedly coupled to a floor 16 of the vehicle 10. The base 14 includes an open-topped receptacle 18. The center console 12 includes a body 20. The body 20 is coupled to the base 14 and is operable to move vehicle-rearward relative to the base 14 from a retracted position to an extended position. The body 20 includes a storage compartment 24, a door 26, and a shelf 28. The door 26 is operably coupled to the storage compartment 24 and is operable between a closed position and an open position, wherein access to the storage compartment 24 is provided. The shelf 28 is positioned vehicle-forward of the storage compartment 24. The shelf 28 covers the receptacle 18 in the retracted position of the body 20. The receptacle 18 is exposed in the extended position of the body 20.

Figure 1A:
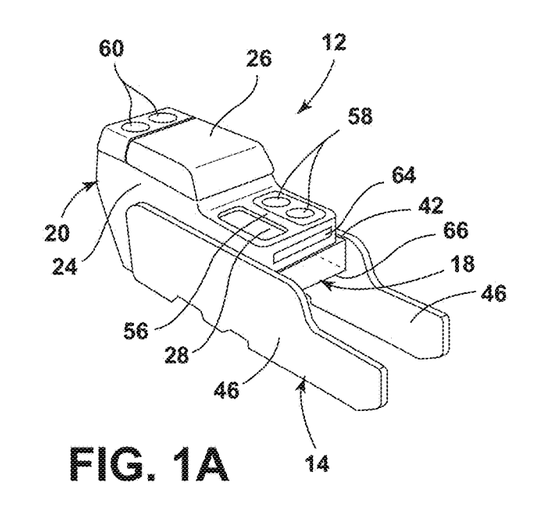
FIG. 1A is an upper perspective view of a center console, illustrating a base having a receptacle and a body coupled to the base that covers the receptacle in a retracted position, according to one embodiment.
Figure 1B:
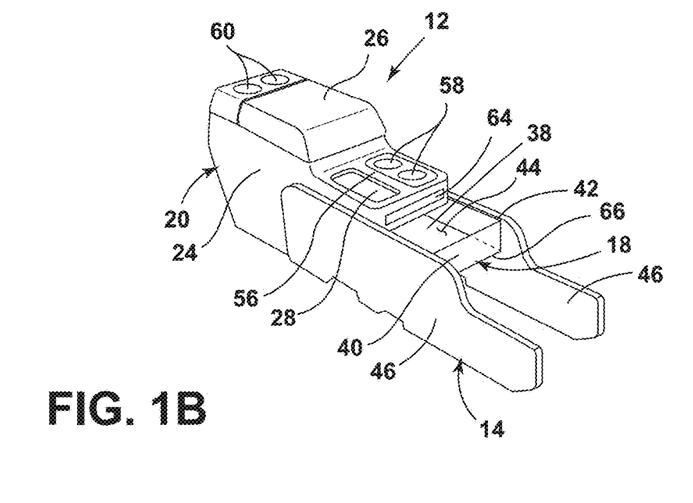
FIG. 1B is an upper perspective view of the center console, illustrating the body in an extended position, such that the receptacle of the base is exposed, according to one embodiment.
Figure 1C:
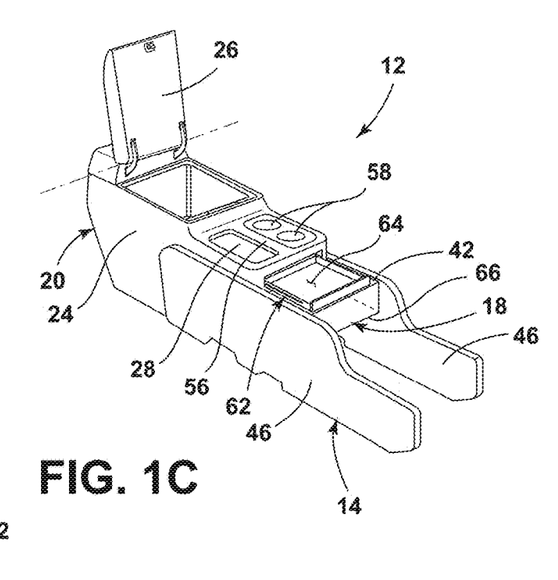
FIG. 1C is an upper perspective view of the center console, illustrating the body in the extended position and a tray coupled to the body in a deployed position generally covering the receptacle of the base, according to one embodiment.
Figure 2A:
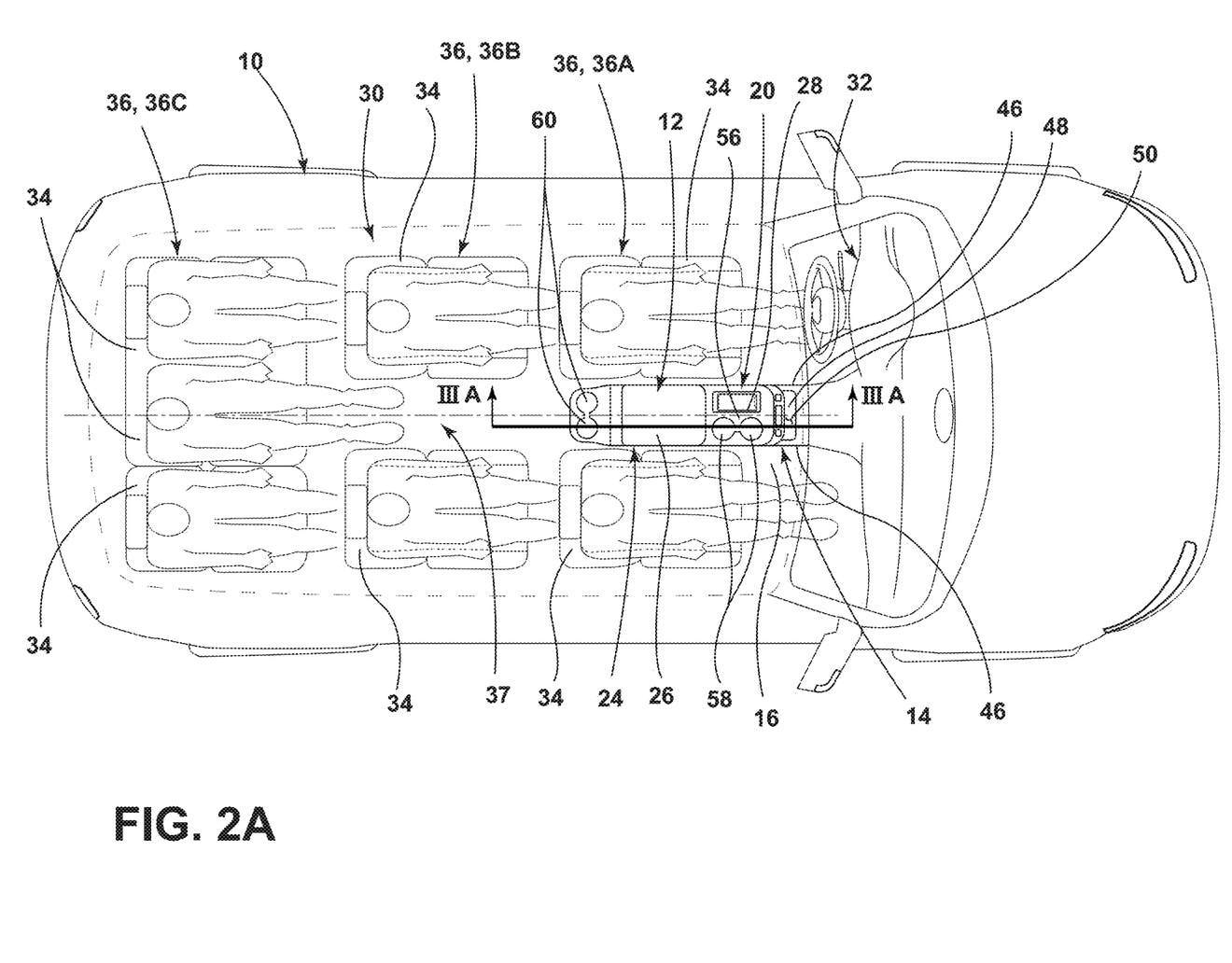
FIG. 2A is a plan view of a vehicle interior, illustrating the center console with the body in the retracted position, according to one embodiment.
Figure 2B:
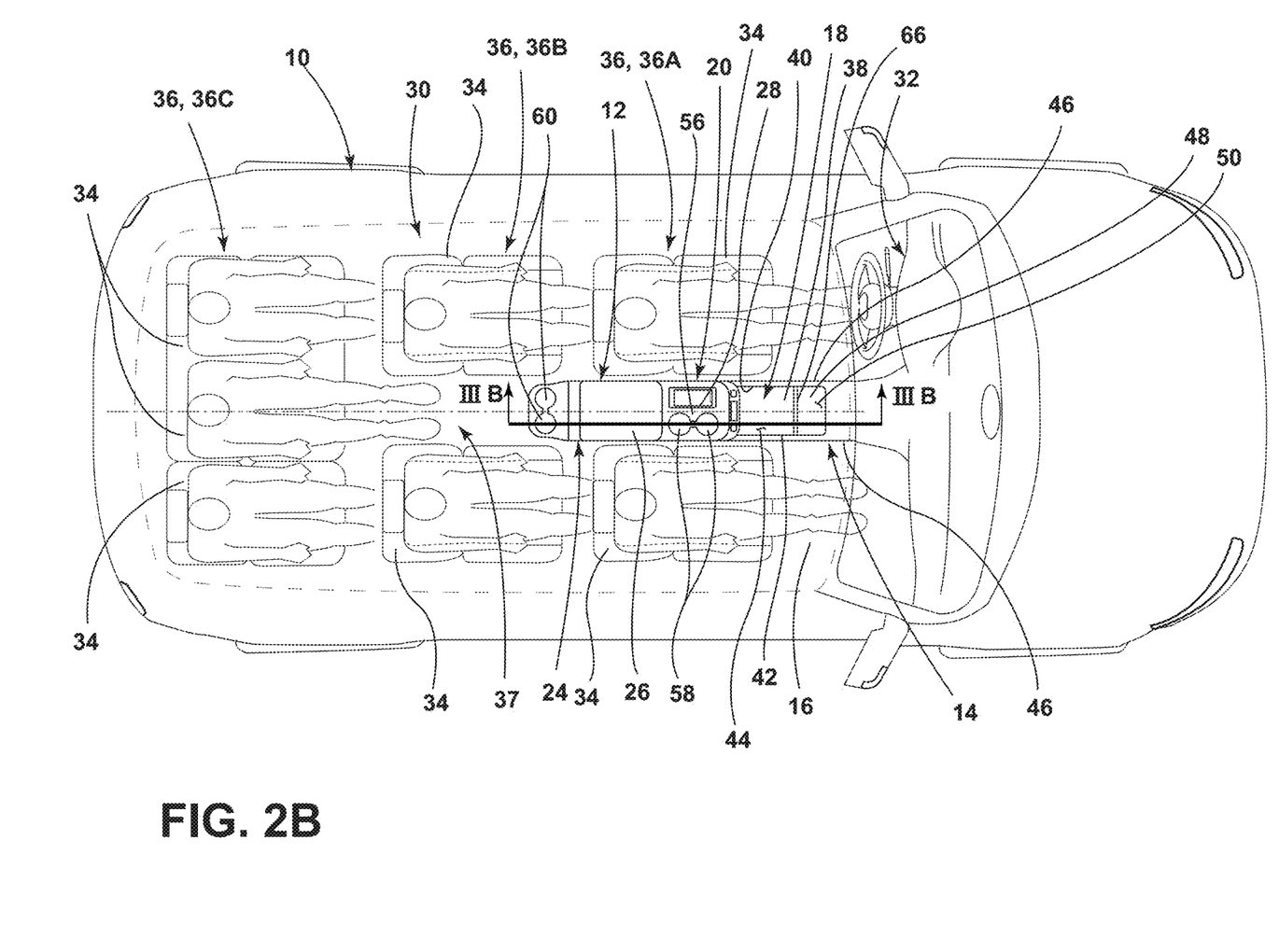
FIG. 2B is a plan view of the vehicle interior, illustrating the center console with the body in the extended position, such that the receptacle of the base is exposed, according to one embodiment.
Figure 2C:
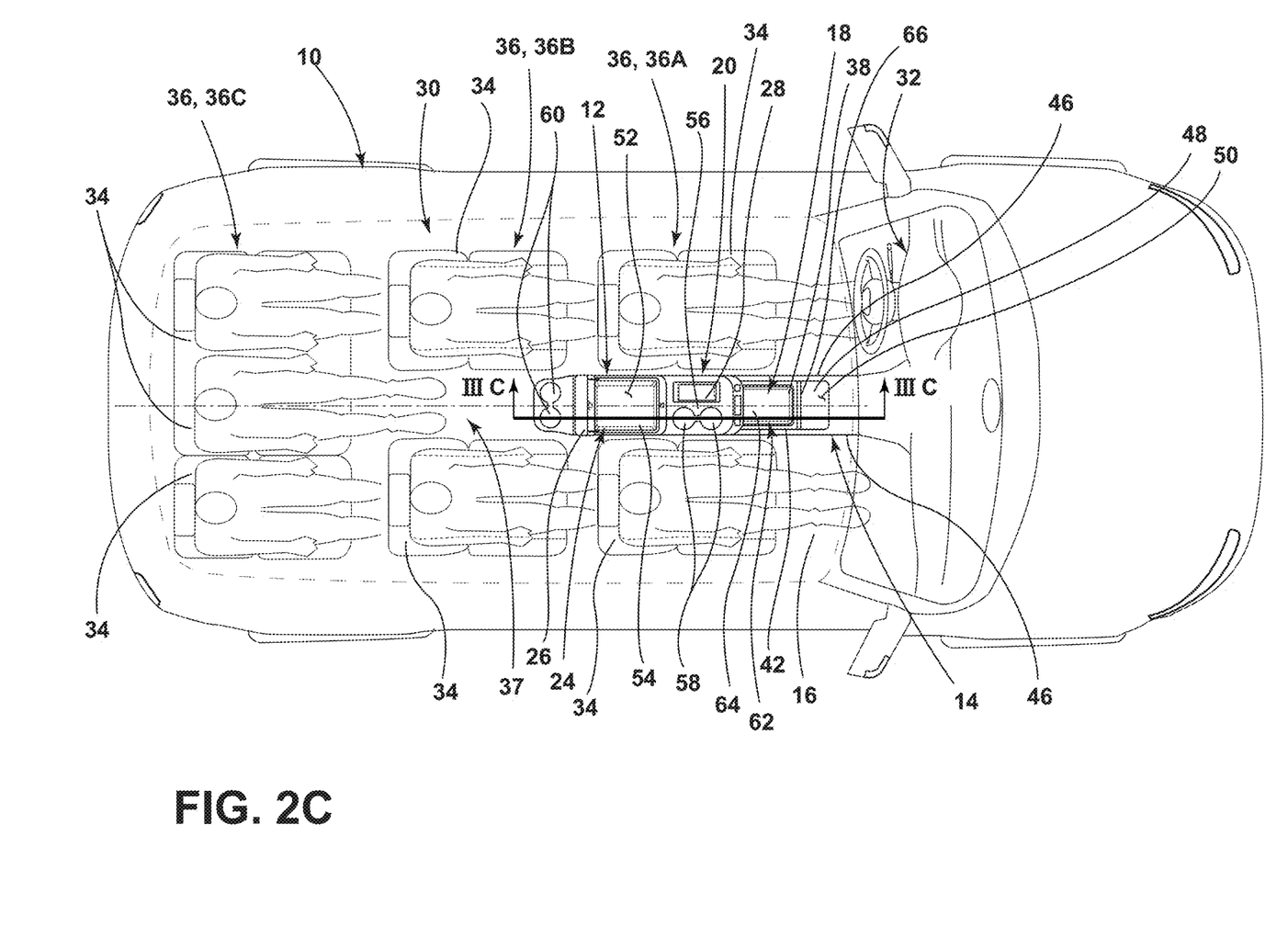
FIG. 2C is a plan view of the vehicle interior, illustrating the center console with the body in the extended position and the tray coupled to the body in the deployed position, such that the tray generally covers the receptacle of the base, according to one embodiment.

Referring now to FIGS. 1A-2C, the vehicle 10 includes a vehicle interior 30. A dashboard 32 is positioned vehicle-upward of the floor 16 of the vehicle 10 at a vehicle-forward end of the vehicle interior 30. In various embodiments, the vehicle interior 30 may include a seating assembly 34. For example, as illustrated in FIGS. 2A-2C, the vehicle interior 30 includes a plurality of seating assemblies 34. At least one of the plurality of seating assemblies 34 may be oriented such that an occupant seated in the at least one seating assembly 34 is facing generally toward the dashboard 32. In other words, at least one of the plurality of seating assemblies 34 may be oriented such that the occupant seated within the at least one seating assembly 34 is facing vehicle-forward.

The plurality of seating assemblies 34 may be arranged into rows of seating 36. In some embodiments, the plurality of seating assemblies 34 may be arranged to form a first row 36A, a second row 36B, and/or a third row 36C. For example, as illustrated in FIGS. 2A-2C, the plurality of seating assemblies 34 is arranged into a first row 36A proximate to the dashboard 32, a second row 36B vehicle-rearward of the first row 36A, and a third row 36C vehicle-rearward of the second row 36B. In the illustrated embodiment, the first row 36A includes two seating assemblies 34, which are depicted as a driver's seat and a front passenger seat. The second row 36B includes two seating assemblies 34 arranged as bucket seats divided by an aisle 37. The third row 36C includes three seating assemblies 34 arranged in a bench-style seating configuration. A variety of types of seating assemblies 34 (e.g., captain's chairs, bucket seats, bench-style seats, etc.) may be implemented variously in the rows of seating 36, and more or fewer rows of seating 36 are contemplated in various implementations. For example, the vehicle 10 may include the first and second rows of seating 36A and 36B and omit the third row of seating 36C.

The vehicle interior 30 includes the center console 12. The center console 12 may be positioned proximate to and/or coupled to the dashboard 32. The center console 12 may extend vehicle-rearward from the dashboard 32. For example, as illustrated in FIGS. 2A-2C, the center console 12 may extend from the dashboard 32 vehicle-rearward between the two seating assemblies 34 in the first row of seating 36A. It is contemplated that the center console 12 may be disposed in a variety of positions within the vehicle interior 30, in various embodiments.

Referring now to FIGS. 1A-3C, the center console 12 may include the base 14 and the body 20. The base 14 may be coupled to the floor 16 of the vehicle 10. For example, the base 14 may be fixedly coupled to the floor 16 of the vehicle 10. In some embodiments, the base 14 may be coupled to the dashboard 32 and may extend vehicle-rearward therefrom. The base 14 includes the receptacle 18. The receptacle 18 may be open-topped. As such, the receptacle 18 may be an open-topped receptacle 18. The receptacle 18 may include a receptacle floor 38 and a side wall 40 that extends vehicle-upward from the receptacle floor 38 to a receptacle rim 42. The receptacle rim 42 may define an opening 44 into the receptacle 18.

Figure 3A:
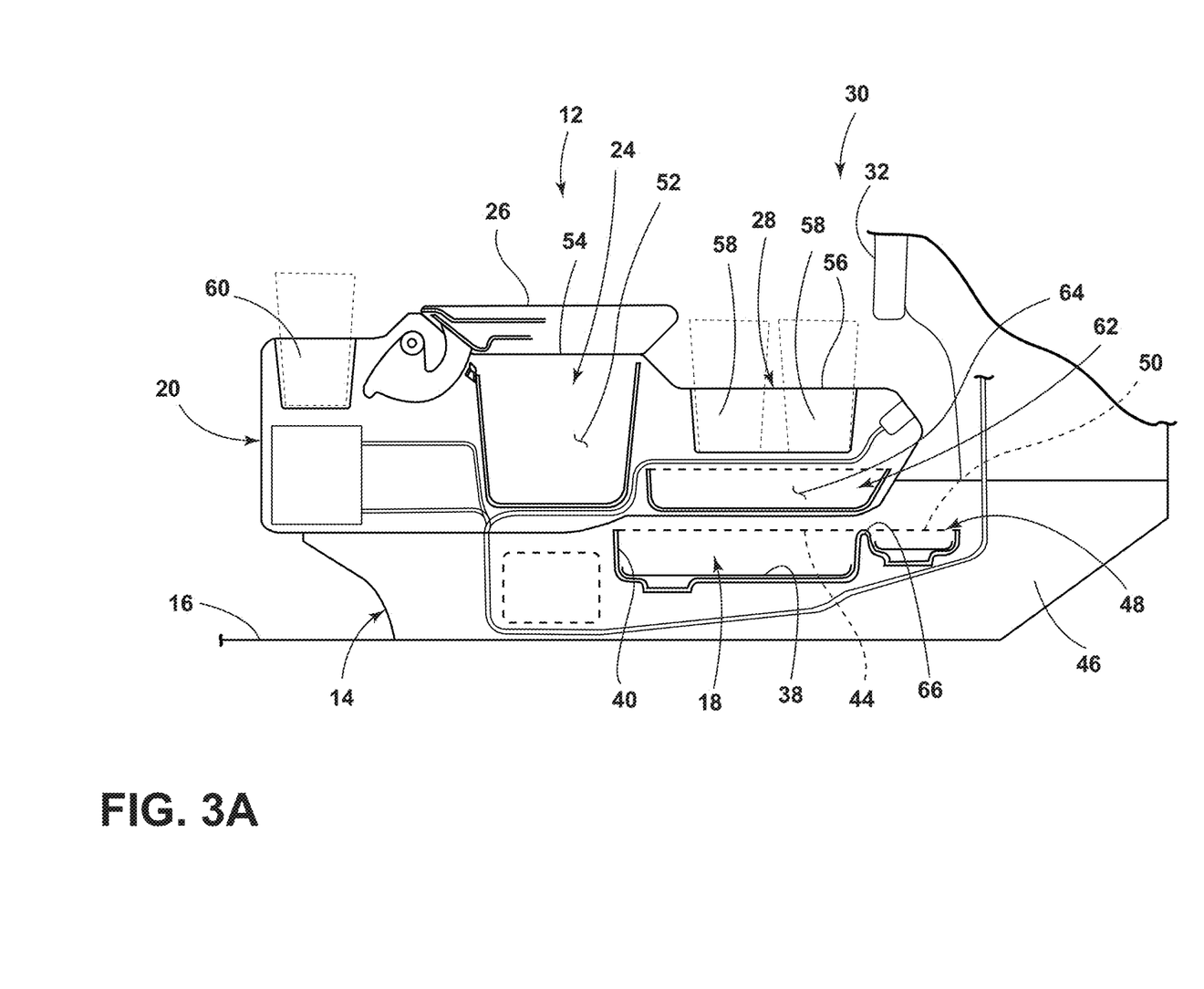
FIG. 3A is a cross-sectional view of the center console of FIG. 2A taken through line IIIA-IIIA, according to one embodiment.
Figure 3B:
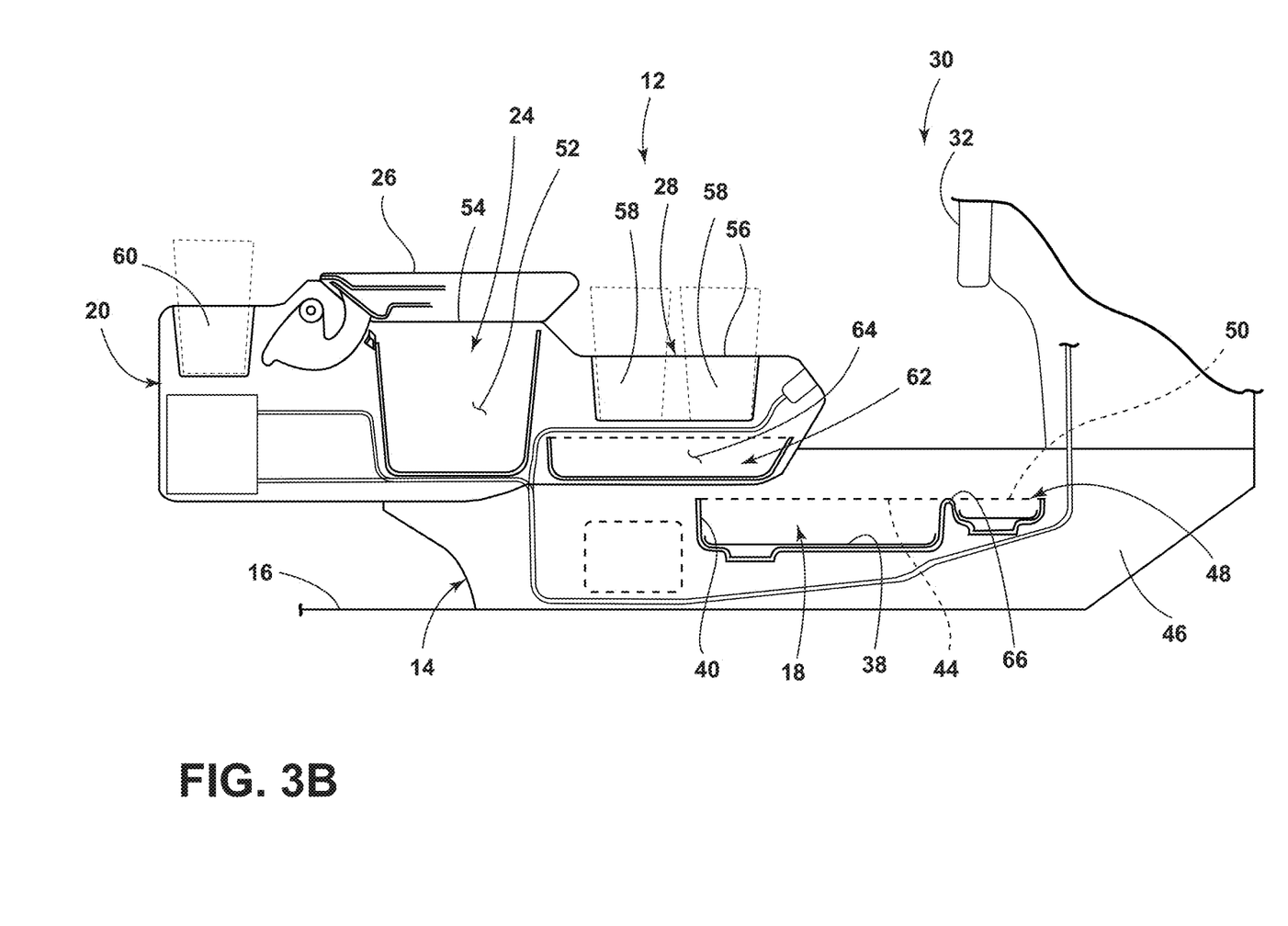
FIG. 3B is a cross-sectional view of the center console of FIG. 2B, taken through line IIIB-IIIB, according to one embodiment.

In the embodiment illustrated in FIG. 1B, the base 14 includes side panels 46 disposed on opposite vehicle-lateral sides of the receptacle 18, such that the receptacle 18 is positioned between the side panels 46. In some embodiments, portions of the side panels 46 may form and/or define the receptacle 18. As illustrated in FIGS. 1A-1C, the side panels 46 extend outward beyond the receptacle 18 generally parallel to each other. As shown in FIGS. 2A-2C, the side panels 46 extend vehicle-forward beyond the receptacle 18 and are coupled to the dashboard 32 of the vehicle 10. As illustrated in FIGS. 2B and 3B, the base 14 may include a secondary receptacle 48 that is positioned vehicle-forward of the receptacle 18. As illustrated in FIG. 3B, the secondary receptacle 48 is smaller than the receptacle 18 and is positioned adjacent to the receptacle 18, such that a portion of the receptacle rim 42 partially defines an opening 50 to the secondary receptacle 48. A variety of types of center console bases 14 that include the receptacle 18 are contemplated.

Referring still to FIGS. 1A-3C, the center console 12 includes the body 20. The body 20 may be coupled to the base 14. The body 20 may be operable to move relative to the base 14 between the retracted position and the extended position. The position of the body 20 in the retracted position may be vehicle-forward of the position of the body 20 in the extended position. In such embodiments, the body 20 may be operable to move vehicle-rearward relative to the base 14 from the retracted position to the extended position. Further, the body 20 may be operable to move vehicle-forward relative to the base 14 from the extended position to the retracted position. In various embodiments, the body 20 may translate between the retracted and extended positions. For example, the body 20 may be slidably coupled to the base 14 and/or the floor 16 of the vehicle 10 and configured to slide between the retracted and extended positions. In the embodiment illustrated in FIGS. 2A, 2B, 3A, and 3B, the base 14 is configured to translate vehicle-rearward from the retracted position (FIGS. 2A and 3A) to the extended position (FIGS.

2B and 3B) and is configured to translate vehicle-forward from the extended position to the retracted position.

Referring now to FIGS. 1A-1C and 3A-3C, in various embodiments, the body 20 may include the storage compartment 24 and/or the shelf 28. As illustrated in FIGS. 1C and 3A-3C, the storage compartment 24 defines a cavity 52 that is accessible through an opening 54 at a vehicle-upward end of the storage compartment 24. The center console body 20 also includes the door 26. The door 26 may be coupled to the body 20. As illustrated in FIGS. 1A-1C, the door 26 is operably coupled to the storage compartment 24 and is operable between a closed position, illustrated in FIGS. 1A and 1B, and an open position, illustrated in FIG. 1C. In the open position, access to the storage compartment 24 is provided through the opening 54 to the storage compartment 24.

Figure 3C:
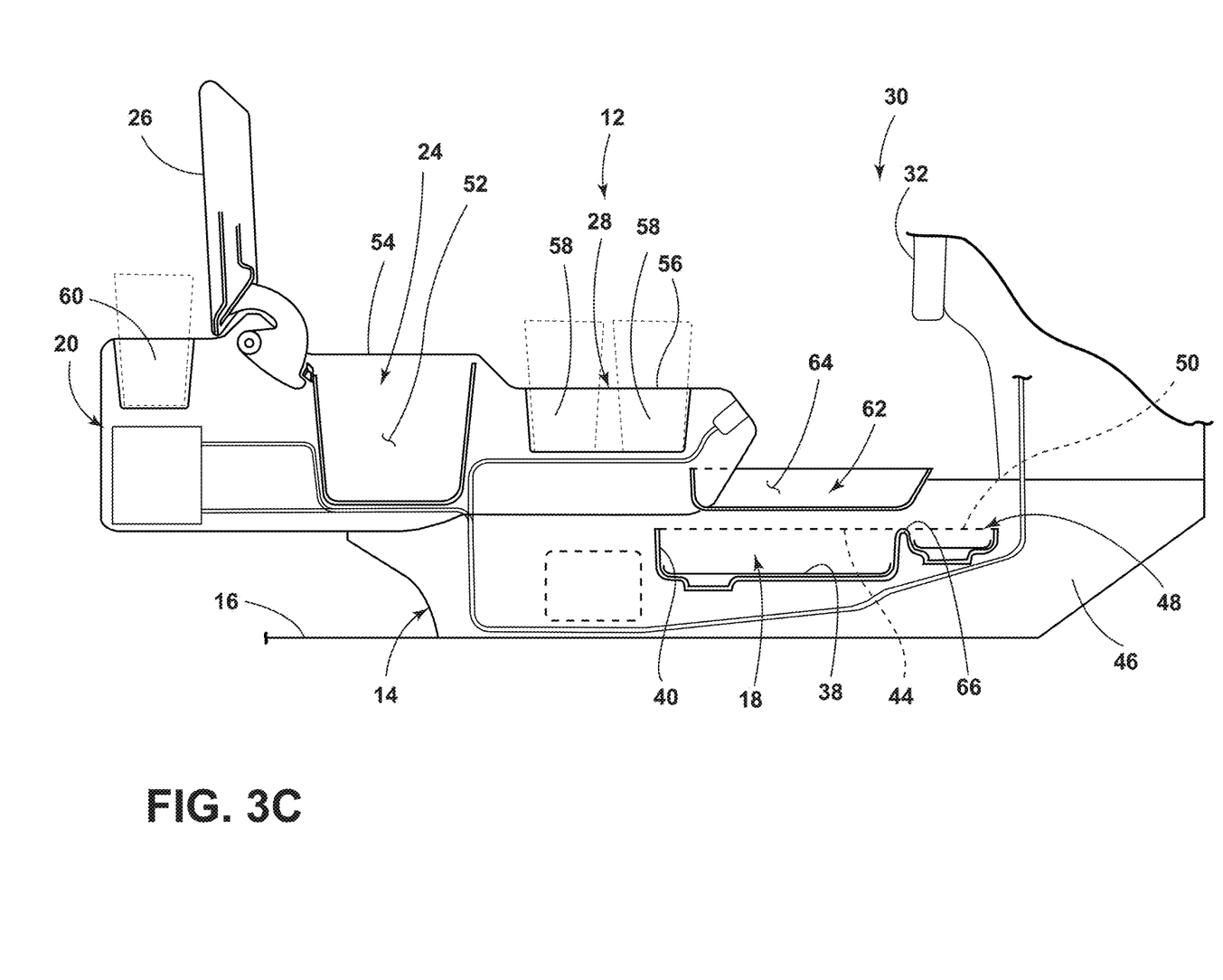
FIG. 3C is a cross-sectional view of the center console of FIG. 2C, taken through line IIIC-IIIC, according to one embodiment.

In various embodiments, the center console body 20 includes the shelf 28. The shelf 28 may be positioned vehicle-forward of the storage compartment 24, as illustrated in FIGS. 2A-3C. The shelf 28 may include an upper surface 56. The upper surface 56 may face vehicle-upward. As illustrated in FIGS. 3A-3C, the upper surface 56 of the shelf 28 may be nearer than the door 26 of the storage compartment 24 to the floor 16 of the vehicle 10. The shelf 28 may include at least one cup holder 58. In some embodiments, the at least one cup holder 58 may be defined by the upper surface 56 of the shelf 28. In some embodiments, the at least one cup holder 58 may be a distinct component from the shelf 28 that is coupled to the shelf 28 (e.g., insert). As illustrated in FIGS. 1A-3C, in some embodiments, the body 20 may include at least one rear cup holder 60. The at least one rear cup holder 60 may be coupled to the body 20, such that the storage compartment 24 is positioned between the shelf 28 and the at least one rear cup holder 60. As illustrated in FIGS. 2A-2C, the at least one rear cup holder 60 is positioned vehicle-rearward of the storage compartment 24 and the shelf 28 of the body 20.

Referring still to FIGS. 1A-3C, in some embodiments, the body 20 of the center console 12 may include a tray 62. The tray 62 may be coupled to the shelf 28 and may be operable to move relative to the shelf 28 between a stowed position and a deployed position. The position of the tray 62 in the stowed position may be vehicle-rearward of the position of the tray 62 in the deployed position. As such, the tray 62 may move vehicle-forward from the stowed position to the deployed position and may move vehicle-rearward from the deployed position to the stowed position. In some embodiments, the tray 62 may be configured to translate between the stowed and deployed positions. For example, in some implementations, the tray 62 may be slidably coupled to the shelf 28, such that the tray 62 slides relative to the shelf 28 between the stowed position and the deployed position. The tray 62 may move from the stowed position to the deployed position in a direction that is substantially parallel to the direction of movement of the body 20 of the center console 12 as the body 20 moves from the extended position to the retracted position.

In the embodiment illustrated in FIGS. 1A-3C, the tray 62 is operably coupled to the shelf 28 of the body 20 vehicle-downward of the upper surface 56 of the shelf 28. The tray 62 is operable to slide relative to the shelf 28 vehicle-forward from the stowed position, wherein the tray 62 is nested within the shelf 28 (FIGS. 1A, 1B, 3A, and 3B), to the deployed position (FIGS. 1C, 2C, and 3C) and slide relative to the shelf 28 vehicle-rearward from the deployed position to the stowed position. The tray 62 may define a basin 64 that faces vehicle-upward. In such embodiments, the basin 64 of the tray 62 may be configured to receive items for storage therein, such that the tray 62 may be used as a drawer.

Referring now to FIGS. 1A, 1B, 2A, 2B, 3A, and 3B, in various embodiments, the body 20 of the center console 12 is configured to cover the receptacle 18 in the retracted position of the body 20, and the receptacle 18 is exposed in the extended position of the body 20. In various embodiments, the shelf 28 of the body 20 may cover the receptacle 18 in the retracted position of the body 20, and movement of the body 20 from the retracted position to the extended position may move the shelf 28 vehicle-rearward, such that the receptacle 18 of the base 14 is exposed. For example, as illustrated in FIGS. 1A and 3A, in the retracted position of the body 20, the shelf 28 is positioned vehicle-upward of the receptacle 18, such that the shelf 28 conceals the receptacle 18 from passengers within the vehicle interior 30. As illustrated in FIGS. 1B and 3B, the shelf 28 is positioned further vehicle-rearward in the extended position of the base 14, which exposes the receptacle 18 of the base 14, such that the receptacle 18 is visible and accessible to passengers within the vehicle interior 30.

In some embodiments, the shelf 28 may cover the receptacle 18 while the body 20 is in the retracted position by extending over a portion of the opening 44 to the receptacle 18. For example, the shelf 28 may cover the receptacle 18 by extending over a majority of the opening 44 of the receptacle 18 in the retracted position of the body 20. In some implementations, the shelf 28 may cover the receptacle 18 in the retracted position of the body 20 by extending over the opening 44 to the receptacle 18 and vehicle-forward to and/or beyond a vehicle-forward-most portion 66 of the receptacle rim 42. In other words, in the retracted position of the body 20, the shelf 28 may extend over the opening 44 of the receptacle 18, and the vehicle-forward-most portion 66 of the receptacle rim 42 may be positioned beneath the shelf 28 of the body 20, as illustrated in FIG. 3A. The vehicle-forward-most portion 66 of the receptacle rim 42 is positioned beneath the shelf 28 when the vehicle-forward-most portion 66 of the receptacle rim 42 is directly vehicle-downward of the shelf 28. In such embodiments, the shelf 28 may cover the receptacle 18 of the base 14 in the retracted position of the body 20 by extending over the entire opening 44 of the receptacle 18. In some embodiments, the body 20 of the center console 12 may cover the receptacle 18 of the base 14 by extending over a portion of the opening 44 to the receptacle 18 and/or the entire opening 44 of the receptacle 18. In some embodiments, the shelf 28 and another portion of the body 20 may together extend over a portion of and/or the entire opening 44 of the receptacle 18 to cover the receptacle 18.

Referring now to FIGS. 1A-3C, in some embodiments, the tray 62 is configured to cover the receptacle 18 if the tray 62 is in the deployed position and the body 20 is in the extended position. For example, as illustrated in FIGS. 2B and 2C, the receptacle 18 is exposed in the extended position of the body 20 and the stowed position of the tray 62 (FIG. 2B), and movement of the tray 62 from the stowed position to the deployed position (FIG. 2C) positions the tray 62 over the receptacle 18, such that the tray 62 covers the receptacle 18. In some embodiments, the tray 62 may cover the receptacle 18 in the deployed position by extending over a portion of the opening 44 to the receptacle 18. For example, the tray 62 may cover the receptacle 18 by extending over a majority of the opening 44 to the receptacle 18 in the deployed position of the tray 62 and the extended position of the body 20. In some embodiments, the tray 62 may cover the receptacle 18 while in the deployed position, such that the vehicle-forward-most portion 66 of the receptacle rim 42 is positioned beneath the tray 62 if the body 20 is in the extended position and the tray 62 is in the deployed position. The vehicle-forward-most portion 66 of the receptacle rim 42 is positioned beneath the tray 62 when the vehicle-forward-most portion 66 of the receptacle rim 42 is positioned directly vehicle-downward of the tray 62. In such embodiments, the tray 62 and/or another component of the body 20 may extend over the entire opening 44 to the receptacle 18 when the body 20 is in the extended position and the tray 62 is in the deployed position. It is contemplated that the tray 62 may cover at least a portion of the opening 50 to the secondary receptacle 48 when the tray 62 is in the deployed position and the body 20 is in the extended position. Further, it is contemplated that the shelf 28 and/or another portion of the body 20 may cover at least a portion of the secondary receptacle 48 when the body 20 is in the retracted position.

Referring now to FIGS. 2A-2C, in various embodiments, the center console 12 may be positioned between seating assemblies 34 that form the first row of seating 36A within the vehicle interior 30. In some embodiments, when the body 20 is in the retracted position, the entire body 20 and/or the entire center console 12 may be positioned further vehicle-forward than at least a portion of at least one seating assembly 34 of the first row of seating 36A, as illustrated in FIG. 2A. As such, in the retracted position, the body 20 of the center console 12 may be conveniently accessible to a passenger seated within the at least one seating assembly 34 of the first row of seating 36A. In some embodiments, at least a portion of the body 20 may be positioned within the aisle 37 dividing the seating assemblies 34 of the second row of seating 36B in the extended position of the body 20. For example, as illustrated in FIG. 2B, a portion of the body 20 is positioned between the two seating assemblies 34 of the second row 36B and further vehicle-rearward than a portion of each of the seating assemblies 34. In some embodiments, at least a portion of at least one seating assembly 34 in the second row of seating 36B may be positioned further vehicle-forward than at least a portion of the body 20 of the center console 12 when the body 20 is in the extended position. In the embodiment illustrated in FIG. 2B, the body 20 is in the extended position, such that the at least one rear cup holder 60 coupled to the body 20 is positioned between seat bases of the seating assemblies 34 that form the second row 36B. It is contemplated that the body 20 of the center console 12 may be wholly vehicle-forward of the at least one seating assembly 34 of the second row 36B while in the extended position, in some embodiments.

In operation of an exemplary embodiment of the present disclosure, the body 20 of the center console 12 may initially be in the retracted position when a first passenger enters the vehicle 10 and occupies a seating assembly 34 in the first row of seating 36A and a second passenger enters the vehicle 10 and occupies a seating assembly 34 in the second row of seating 36B. The first passenger, desiring to stow a handbag, slides the body 20 of the center console 12 vehicle-rearward relative to the base 14 from the retracted position to the extended position to expose the receptacle 18 of the base 14. With the body 20 in the extended position, the first passenger is able to stow the handbag within the exposed receptacle 18 of the base 14, and the second passenger is able to deposit a beverage container within the at least one rear cup holder 60 of the body 20, as the body 20 is positioned within the aisle 37 between the seating assemblies 34 of the second row 36B while in the extended position. Next, a third passenger enters the vehicle 10 with the intention of occupying a seating assembly 34 in the third row of seating 36C. To make room for the third passenger to maneuver through the aisle 37 between the seating assemblies 34 of the second row 36B to the third row of seating 36C, the second passenger slides the body 20 of the center console 12 vehicle-forward from the extended position to the retracted position. As the body 20 moves from the extended position to the retracted position, the shelf 28 of the body 20 extends over the receptacle 18 and the handbag stowed therein, such that the handbag and the receptacle 18 are covered and generally concealed by the shelf 28. Once the third passenger has maneuvered between the first and second seating assemblies 34 of the second row 36B to the third row of seating 36C, the first passenger moves the body 20 back to the extended position, revealing the handbag, and positioning the beverage container deposited in the at least one rear cup holder 60 conveniently within reach of the second passenger. Next, the first passenger retrieves a food item from the handbag disposed within the receptacle 18. Not wanting to spill the food item on the handbag and desiring a surface to rest the food item on, the first passenger slides the tray 62 coupled to the shelf 28 from the stowed position to the deployed position. In the deployed position, the shelf 28 covers the receptacle 18 and the handbag positioned therein, and provides a surface where the food item may be placed. Before exiting the vehicle 10, the first passenger moves the tray 62 from the deployed position to the stowed position and removes the handbag from the receptacle 18, and the second passenger slides the body 20 from the extended position to the retracted position to cover the receptacle 18 and allow the third passenger in the third row of seating 36C to conveniently exit the vehicle 10 through the aisle 37.

The present disclosure may provide a variety of advantages. First, the body 20 of the center console 12 being operable to move from the retracted position to the extended position may provide access to the receptacle 18 of the base 14 and allow passengers seated in the second row of seating 36B to more easily access the body 20 of the center console 12. Second, the body 20 of the center console 12 extending over the receptacle rim 42 and not through the opening 44 into the receptacle 18 while in the retracted position may allow for items to be stowed within the receptacle 18 in the retracted and extended positions of the body 20. Third, the tray 62 being operable between the stowed and deployed positions may allow the receptacle 18 to be covered when the body 20 is in the extended position, and may provide a usable surface in place of the shelf 28 of the body 20 when the body 20 is in the extended position.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A center console for a vehicle, comprising:
   a base fixedly coupled to a floor of the vehicle and having an open-topped receptacle, the receptacle comprising:
      a receptacle floor; and
      a side wall extending vehicle-upward from the receptacle floor to a receptacle rim that defines and surrounds an opening to the receptacle; and
   a body coupled to the base and operable to move vehicle-rearward relative to the base from a retracted position to an extended position, the body comprising:
      a storage compartment;
      a door operably coupled to the storage compartment and operable between a closed position and an open position, wherein access to the storage compartment is provided; and
      a shelf positioned vehicle-forward of the storage compartment, wherein the shelf covers the receptacle in the retracted position of the body, and the receptacle is exposed in the extended position of the body.

2. The center console of claim 1, wherein the shelf comprises:
   at least one cup holder.

3. The center console of claim 1,
   wherein a vehicle-forward-most portion of the receptacle rim is positioned beneath the shelf in the retracted position of the body.

4. The center console of claim 1, wherein the body further comprises:
   a tray coupled to the shelf and operable to move relative to the shelf between a stowed position and a deployed position vehicle-forward of the stowed position, wherein the tray is configured to cover the receptacle if the tray is in the deployed position and the body is in the extended position.

5. The center console of claim 4,
   wherein a vehicle-forward-most portion of the receptacle rim is positioned beneath the tray if the body is in the extended position and the tray is in the deployed position.

6. The center console of claim 1, wherein the shelf comprises:
   an upper surface that faces vehicle-upward, wherein the upper surface is nearer than the door to the floor of the vehicle.

7. A center console for a vehicle, comprising:
   a base coupled to the vehicle and having a receptacle; and
   a body operable to move relative to the base between a retracted position and an extended position and having a tray operable between a stowed position and a deployed position, wherein the body covers the receptacle in the retracted position, the receptacle is exposed if the body is in the extended position and the tray is in the stowed position, and the tray covers the receptacle if the body is in the extended position and the tray is in the deployed position, wherein the body further comprises:
      a shelf having at least one cup holder and being operably coupled to the tray, such that the tray moves relative to the shelf between the stowed and deployed positions;
      a storage compartment that is positioned further than the shelf from the receptacle in the extended position of the body; and
      at least one rear cup holder, wherein the storage compartment is positioned between the shelf and the at least one rear cup holder, and wherein the shelf covers the receptacle in the retracted position of the body, and the receptacle is positioned beneath the at least one cup holder in the retracted position of the body.

8. The center console of claim 7, wherein the receptacle comprises:
   a receptacle floor; and
   a side wall extending vehicle-upward from the receptacle floor to a receptacle rim that defines an opening to the receptacle, wherein a vehicle-forward-most portion of the receptacle rim is positioned beneath the body in the retracted position of the body and is positioned beneath the tray if the body is in the extended position and the tray is in the deployed position.

9. A center console for a vehicle, comprising:
a base coupled to the vehicle and having a receptacle; and
a body coupled to the base and having a shelf, wherein the body is operable to move relative to the base, without entering or changing a volume of a storage area defined by the receptacle, between a retracted position, wherein the shelf covers the receptacle, and an extended position, wherein the receptacle is exposed.

10. The center console of claim 9, wherein the body is configured to translate vehicle-rearward from the retracted position to the extended position and translate vehicle-forward from the extended position to the retracted position.

11. The center console of claim 10, wherein the receptacle comprises:
a receptacle floor; and
a side wall extending vehicle-upward from the receptacle floor to a receptacle rim that defines an opening to the receptacle, wherein a vehicle-forward-most portion of the receptacle rim is positioned beneath the shelf in the retracted position of the body.

12. The center console of claim 10, wherein the body further comprises:
a storage compartment positioned vehicle-rearward of the shelf.

13. The center console of claim 10, wherein the shelf comprises:
at least one cup holder, wherein the receptacle is positioned beneath the at least one cup holder in the retracted position of the base.

14. The center console of claim 9, wherein the base is fixedly coupled to a floor of the vehicle.

15. The center console of claim 10, wherein the body further comprises:
a tray coupled to the shelf and operable to move relative to the shelf between a stowed position and a deployed position, wherein the tray is configured to cover the receptacle if the body is in the extended position and the tray is in the deployed position.

* * * * *